(12) United States Patent
Segal et al.

(10) Patent No.: US 6,647,069 B1
(45) Date of Patent: Nov. 11, 2003

(54) METHOD AND APPARATUS FOR CAPACITY INCREASE AND ENHANCED COMMUNICATIONS PERFORMANCE IN CATV NETWORKS

(75) Inventors: Mordechai Segal, Herzlia (IL); Ofir Shalvi, Herzlia (IL); Zvi Reznic, Tel-Aviv (IL)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/302,872

(22) Filed: Apr. 30, 1999

Related U.S. Application Data

(60) Provisional application No. 60/083,934, filed on May 1, 1998, and provisional application No. 60/083,952, filed on May 1, 1998.

(51) Int. Cl.[7] .............................................. H04L 27/10
(52) U.S. Cl. ...................... 375/278; 375/284; 375/285; 375/296; 375/324; 375/350; 455/50.1; 455/63; 455/67.3; 455/306; 348/21
(58) Field of Search ................................ 375/219, 220, 375/222, 251, 260, 267, 262, 278, 284, 285, 296, 298, 324, 335, 340, 346, 350, 341; 455/50.1, 63, 67.3, 103, 133, 295, 296, 306; 348/6, 21; 370/282, 478, 464, 533, 535, 536, 539; 725/54, 67–68, 98, 118, 148, 151

(56) References Cited

U.S. PATENT DOCUMENTS

| | | | | |
|---|---|---|---|---|
| 5,148,548 A | * | 9/1992 | Meche et al. | ................ 455/514 |
| 5,202,900 A | * | 4/1993 | Leitch | ........................ 375/278 |
| 5,412,352 A | * | 5/1995 | Graham | ....................... 332/103 |
| 5,692,020 A | * | 11/1997 | Robbins | ....................... 375/350 |
| 5,710,797 A | | 1/1998 | Segal et al. | |
| 5,867,537 A | * | 2/1999 | Dent | ........................... 375/298 |
| 5,883,899 A | * | 3/1999 | Dahlman et al. | ........... 370/468 |
| 6,141,387 A | * | 10/2000 | Zhang | ......................... 375/261 |
| 6,167,237 A | * | 12/2000 | Rapeli | ......................... 455/63 |
| 6,216,250 B1 | * | 4/2001 | Williams | .................... 714/752 |
| 6,360,369 B1 | * | 3/2002 | Mahoney | .................... 375/232 |

FOREIGN PATENT DOCUMENTS

| | | |
|---|---|---|
| EP | 0 449 327 A2 | 10/1991 |
| EP | 0 748 124 A3 | 12/1996 |
| WO | WO 91/18458 | 11/1991 |
| WO | WO 97/16046 | 5/1997 |
| WO | WO 97/41691 | 11/1997 |
| WO | WO 97/49171 | 12/1997 |

OTHER PUBLICATIONS

"Networks for Homes", IEEE Spectrum, 0018–9235/99/1999 IEEE, Dec., 1999, pp. 26–33, (DUTTA–ROY, AMITAVA).

* cited by examiner

Primary Examiner—Stephen Chin
Assistant Examiner—Dac V. Ha
(74) Attorney, Agent, or Firm—Tammy L. Williams; W. James Brady, III; Frederick J. Telecky, Jr.

(57) ABSTRACT

In a cable television (CATV) data communication network, channel throughput and communications robustness are increased in a manner that improves speed of data transmission while maintaining compatibility with existing specifications and equipment. Enhanced throughput can be realized using the return channel of the CATV network. Alternatively, data retransmission and/or diversity techniques can be used to improve throughput.

10 Claims, 13 Drawing Sheets

|  FIRST SYMBOL  |  |  |  | SECOND SYMBOL |  |  |  |
|---|---|---|---|---|---|---|---|
| A1 | A2 | A3 | A4 | C3 | C1 | C4 | C2 |
| B1 | B2 | B3 | B4 | A3 | A1 | A4 | A2 |
| C1 | C2 | C3 | C4 | D3 | D1 | D4 | D2 |
| D1 | D2 | D3 | D4 | B3 | B1 | B4 | B2 |

FIG. 12A

| FIRST SYMBOL |  |  |  | SECOND SYMBOL |  |  |  |
|---|---|---|---|---|---|---|---|
| A1 | A2 | A3 | A4 | C2 | C4 | C1 | C3 |
| B1 | B2 | B3 | B4 | A3 | A1 | A4 | A2 |
| C1 | C2 | C3 | C4 | D2 | D4 | D1 | D3 |
| D1 | D2 | D3 | D4 | B3 | B1 | B4 | B2 |

METHOD AND APPARATUS FOR CAPACITY INCREASE AND ENHANCED COMMUNICATIONS PERFORMANCE IN CATV NETWORKS

RELATED APPLICATIONS

This application claims the benefit of U.S. Provisional Applications Ser. Nos. 60/083,934 and 60/083,952, both of which were filed on May 1, 1998 under 35 U.S.C. §119(e).

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright©1999, Libit Signal Processing, Ltd., All Rights Reserved.

TECHNICAL FIELD

The present invention relates generally to communication methods and systems and in particular to communication methods and systems implemented using CATV (Cable Television) systems.

BACKGROUND OF THE INVENTION

Cable television (CATV) systems were originally intended to deliver analog television signals to homes in an essentially unidirectional manner. However, the coaxial cable used to carry these signals can support bidirectional transmission of signals, i.e., transmission both to and from the home. As a result, cable television companies have begun to provide data communications services to meet consumers' growing demand for high speed data transmission over computer networks, such as the Internet.

Devices known as cable modems have been developed to convert digital data to a modulated radio frequency (RF) signal, and vice versa, for transmission on a CATV system. This conversion is performed both by a cable modem at the subscriber's home and, on the other end, by headend equipment handling multiple subscribers. Thus, the subscriber receives data from a computer network using a downstream channel and transmits data to the network using an upstream channel.

As computer networks deliver increasing amounts of content to users, a need has arisen for increased throughput and communications robustness. It is also essential that communications equipment operate over a wide range of channel impairments, which can include, for example, ingress noise, burst noise, impulse noise, linear distortions, non-linear distortions, and adjacent channel interference. Moreover, the different types of services that use CATV systems give rise to additional needs. For example, for data services, such as Internet access, a high packet throughput and a low packet error rate are primary considerations. For such applications, low delay is not a key consideration. For multimedia services, such as speech, video, and telephony, however, low delay is the primary consideration. It is desirable to minimize the periods of a high bit error rate (BER) for these applications. Additionally, compatibility with existing standards and equipment is important for all applications.

SUMMARY OF THE INVENTION

According to one embodiment of the present invention, a transmission arrangement is used for transmitting a data signal using a cable television transmission medium. An encoder encodes an input data stream as an encoder output signal. Adjacent channel interference in this signal is then reduced using a transmission filter arrangement, thereby generating a filter output signal. A modulator modulates the filter output signal to generate a modulated radio frequency signal for transmission using the cable television transmission medium. Another embodiment is directed to a communication system that, in addition to the above, includes a receiver arrangement that generates a stream of detected data based on the received modulated radio frequency signal.

Yet another embodiment of the present invention is directed to an analog front end arrangement for use in the communication system. The analog front end arrangement comprises a plurality of band pass filters coupled to receive a modulated radio frequency signal. Each of the band pass filters is centered around a different frequency. The sample rate is less than the Nyquist rate so as to cause aliasing deliberately. A multiplexer receives output signals from the band pass filters and couples a selected one of the band pass filter output signals to an output of the multiplexer. An analog to digital converter provides a digital signal, generated as a function of the output of the multiplexer and a clock signal, to a digital receiver. Sample rate logic provides, as a function of the center freqeuency, a select signal to the multiplexer, a rate parameter to the clock signal generator, and a spectrum inversion indication to the digital receiver.

Other embodiments are directed to methods for transmitting or communicating a data signal using a cable television transmission medium.

Another aspect of the present invention provides methods and arrangements for robust communications over noisy communications channels using data retransmission and/or diversity techniques. In one particular embodiment, a comunication arrangement includes an encoder that reproduces a symbol or FEC block represented by a segment of an input data stream a predetermined number of times. A transmission arrangement having a plurality of transmission channels transmits each reproduced symbol or FEC block using a distinct transmission channel. A receiver performs soft-combining of signals received from the outputs of the transmission arrangement.

The present invention can be implemented in full compliance with current network specifications and/or on top of the existing specifications in a manner that enables co-existence of advanced modems designed according to the present invention with current modems.

BRIEF DESCRIPTION OF THE DRAWINGS

In the drawings, in which like reference numbers represent like components throughout the several views.

FIGS. 12A–12B depict two example symbol mapping schemes that can be used in conjunction with the retransmission technique depicted in FIG. 11;

FIG. 14 depicts a symbol mapping scheme that can be used in conjunction with the signal diversity technique depicted in FIG. 13.

Figure 1:
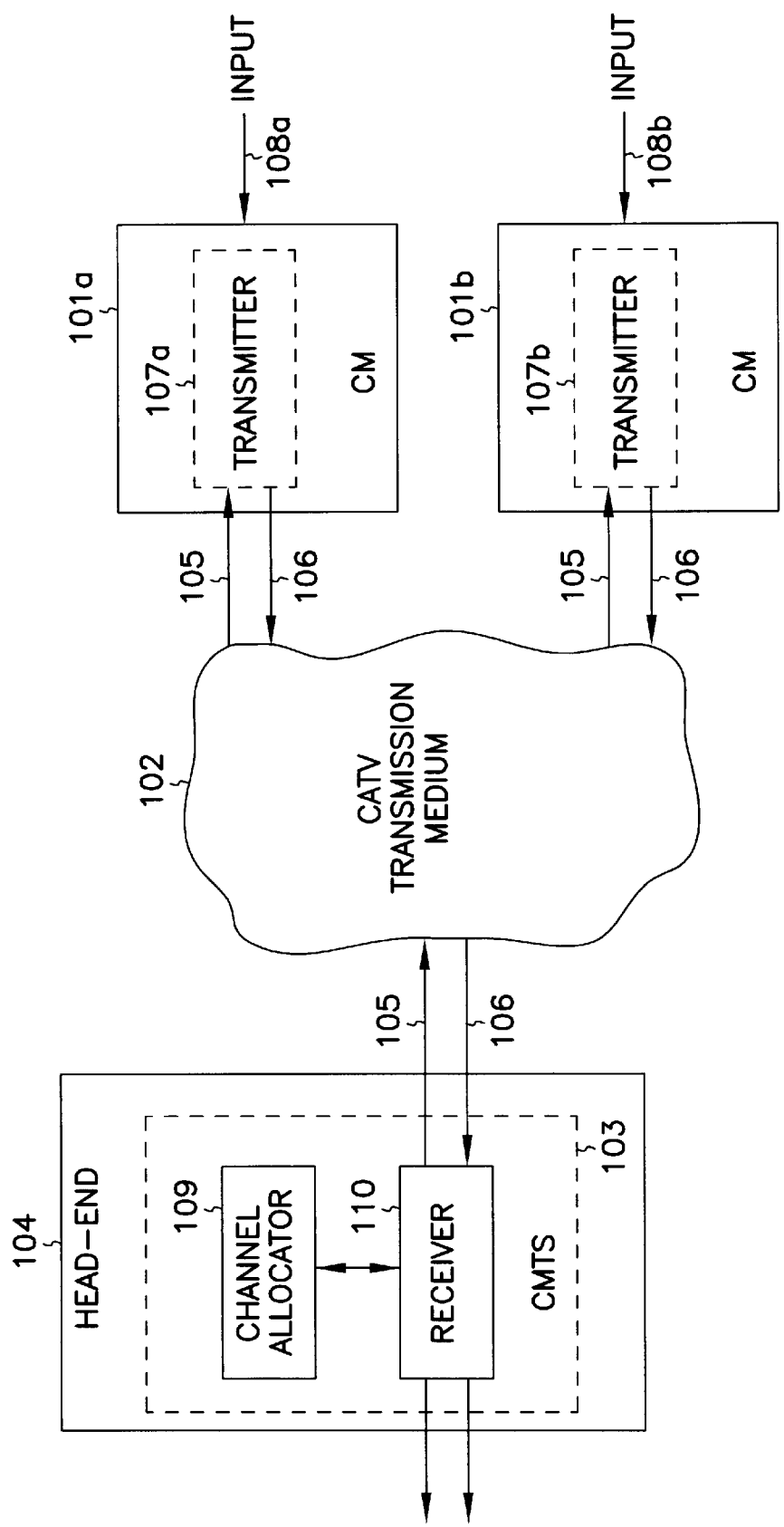
FIG. 1 depicts a CATV digital communications system operative according to the Data Over Cable Service Interface Specification (DOCSIS) protocol.

The invention is amenable to various modifications and alternative forms. Specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to a variety of communications networks operating over a cable television (CATV) infrastructure. An appreciation of various aspects of the invention can be gained through a discussion of various application examples operating in such an environment.

According to one example embodiment of the present invention, channel throughput and communications robustness are increased in the upstream or return channel of a CATV network. A filter arrangement is used to reduce interference between adjacent frequency channels, facilitating the use of a frequency grid characterized by reduced channel spacing.

Referring now to the drawings, FIG. 1 depicts a CATV digital communication system embodying the present invention and operating according to the MCNS specification. For additional information regarding this specification, reference is made to Data-Over-Cable Interface Specifications: Radio Frequency Interface Specification SP-RF1101-970321, published by MCNS Holdings, L. P. on Mar. 21, 1997 (hereinafter referred to as the MCNS specification).

The system includes one or more cable modems (CMs) 101a, 101b and a CATV transmission medium 102. It should be noted that, while FIG. 1 depicts two CMs, a greater or lesser number of CMs can be present in the system. A cable modem terminating system (CMTS) 103, which is part of CATV head-end equipment 104, is present at the other side of the network. Information is transmitted from the CMTS 103 to the CMs 101 using a downstream channel 105, and from the CMs 101 to the. CMTS 103 using an upstream channel 106.

The CMs 101a, 101b include upstream transmitters 107a, 107b that receive input data 108a, 108b and transmit the input data 108a, 108b using a Quadrature Phase Shift Keying/Quadrature Amplitude Modulation (QPSK/16QAM) modulation scheme with a configurable transmission pulse, pre-equalizer parameters, power level, carrier frequency, symbol clock, and Reed-Solomon forward error correction (FEC) code parameters. Transmission is performed in a burst mode frequency/time division multiple access (FDMA/TDMA) scheme in which each CM 101 transmits requests for bandwidth allocation, and in which a channel allocator 109 sends control messages to the CMs 101 via the downstream channel 105, indicating the time period in which the addressed CM 101 can transmit. The CM 101 is capable of modifying its signal parameters, including transmission power, carrier frequency, transmission pulse, and pre-equalizer parameters, according to these control messages from the channel allocator 109.

The CMTS 103 includes a receiver 110 and the channel allocator 109. The receiver 110 detects the information bits fed into the inputs 108a, 108b of the upstream transmitters 107a, 107b. The receiver 110 then estimates the parameters of the received signals, and outputs these parameters to the channel allocator 109. The channel allocator 109 then allocates frequency ranges and configures transmission parameters for the individual CMs 101 in a manner that will make efficient use of the channel bandwidth and that will enable the receiver to detect the signals properly.

Figure 2:
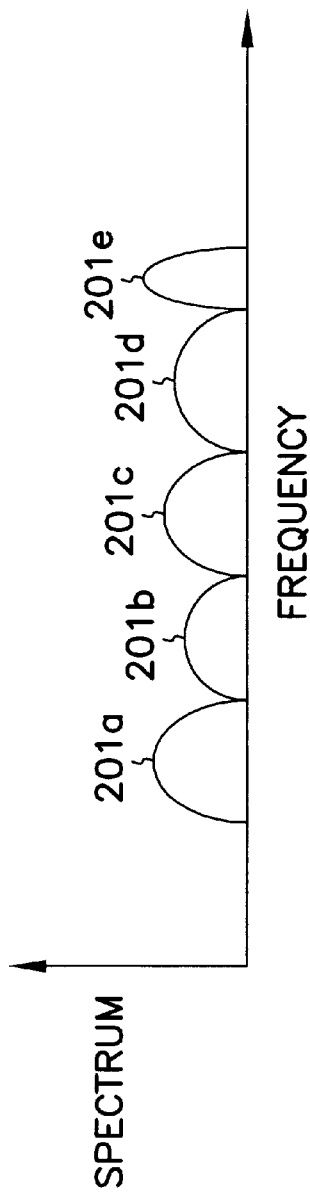
FIG. 2 depicts a frequency grid over an upstream channel of a CATV network operative according to the MCNS specification.

FIG. 2 depicts a frequency constellation of a CATV network operative according to the MCNS specification. Signals 201a–201c have the same nominal symbol rate, while signal 201d has a larger symbol rate, and signal 201e has a lower symbol rate. The nominal bandwidth of each signal 201a–201e is 1.25 times its respective symbol rate.

Figure 3:
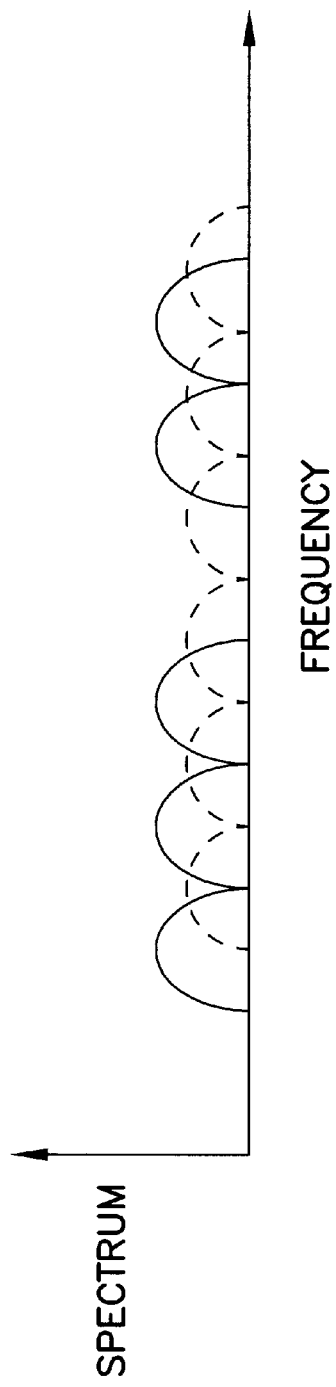
FIG. 3 depicts a reduced channel spacing frequency grid of the upstream channel that can be used in conjunction with the MCNS specification according to an embodiment of the present invention.

FIG. 3 depicts an example of a reduced channel spacing frequency grid with which the present invention can be used. The channel spacing is less than the signal bandwidth, which is 1.25 times the symbol rate of the signals. Such a system uses overlapped transmission scheme, such as that disclosed in U.S. Pat. No. 5,710,797, issued on Jan. 20, 1998, assigned to the instant assignee, and entitled METHOD AND APPARATUS FOR DIGITAL COMMUNICATION IN THE PRESENCE OF CLOSELY SPACED ADJACENT CHANNELS, the disclosure of which is hereby incorporated by reference in its entirety.

Figure 4:
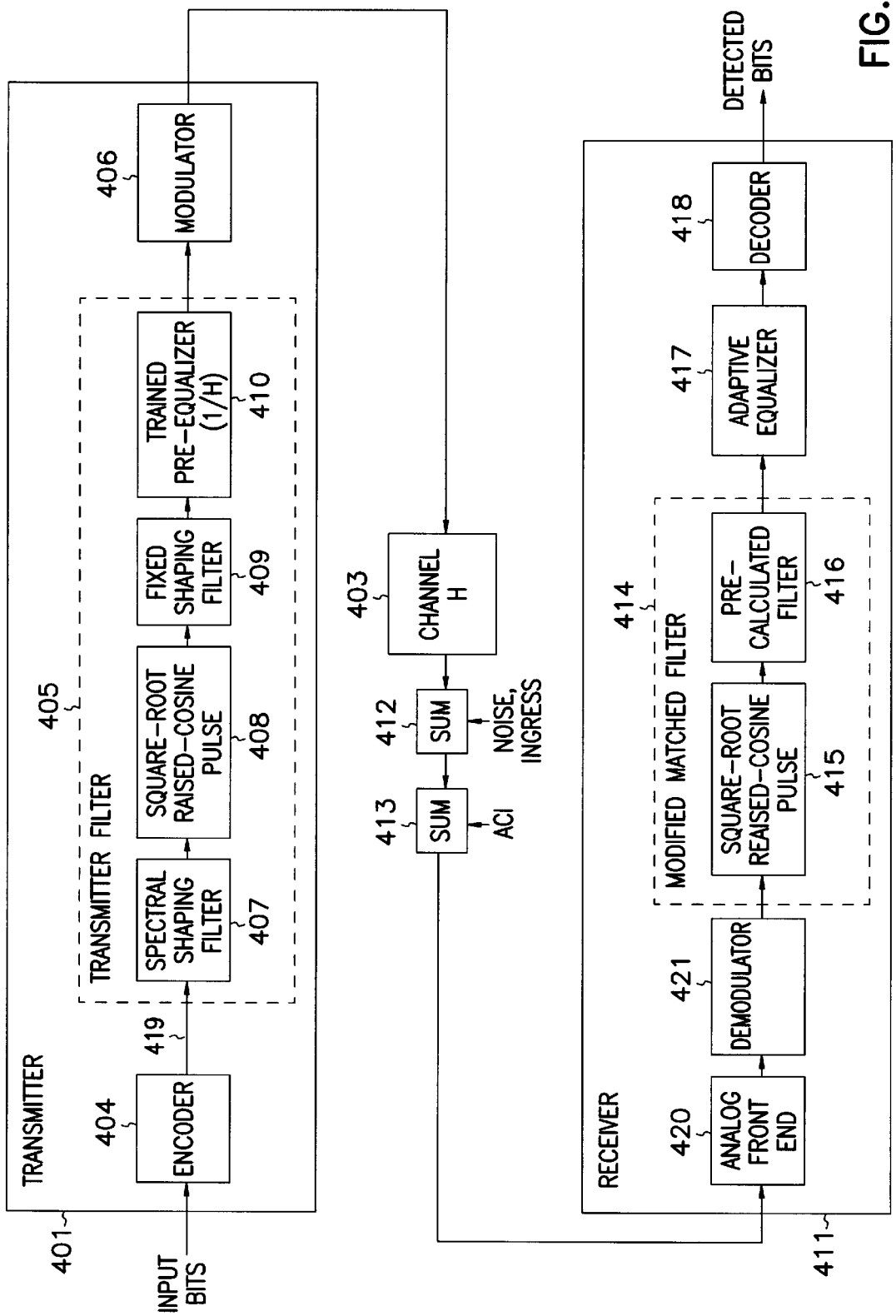
FIG. 4 depicts a simplified block diagram of a communications apparatus constructed and operative for upstream CATV applications according to an embodiment of present invention.

Referring now to FIG. 4, a simplified block diagram is depicted of a communications apparatus constructed and operative for upstream CATV applications according to a particular embodiment of the present invention. The apparatus of FIG. 4 includes a transmitter 401 that transmits a digital communication signal 402 through an upstream channel 403. The transmitter 401 comprises an encoder 404, a transmission filter 405, and a modulator 406. The transmission filter 405 comprises a cascade of a spectral shaping filter 407, a square-root raised cosine filter 408, a fixed shaping filter 409, and a trained pre-equalizer 410. This transmission structure may be supported by the current MCNS specification, and therefore may be supported by current MCNS implementations.

The encoder 404 can include any Forward Error Correction (FEC) code, such as Reed-Solomon encoding. The encoder 404 optionally uses an interleaver within the packet in order to counteract impulse/burst noise. Using an interleaver in this manner, however, involves modifications that may not be consistent with existing DOCSIS specifications. Alternate signal constellations can be used instead of those specified in the MCNS specification. Examples of such alternate signal constellations include, but are not limited to, pi/4-QPSK, offset-QPSK, 8PSK, 32QAM, 64QAM, 128QAM, and 256QAM. The choice of a particular signal constellation is dependent on channel conditions. Tomlinson precoding can also be used to avoid a DFE at the receiver 411, but this technique also involves modifications that may not be consistent with existing DOCSIS specifications.

According to a particular implementation, the spectral shaping filter 407 comprises a duo-path filter $(1+\alpha z^{-N}$, where $\alpha$ can be a complex number) or any other pre-equalizer that can be used to achieve an approximation to the water-pouring spectral density in conjunction with a DFE receiver, e.g. $(1+e^{-j\omega_0}z^{-1})$ for elimination of narrow-band interference at $\omega_0$. The purpose of the shaping filters 407, 408, and 409 is to reduce adjacent channel interference (ACI) to facilitate the use of a frequency grid characterized by reduced channel spacing.

The fixed shaping filter 409 is designed for a more or less known level of signal-to-noise (SNR) ratio and Signal-to-Interference (C/I) ratio, and may be loaded during ranging when the C/I and SNR are assessed. The trained pre-equalizer 410 performs essentially the inverse 1/H of the transfer function H of the upstream channel 403 and is trained at the receiver 411, where the parameters describing the upstream channel 403 are transmitted to the CM 101 through a downstream channel 105 of FIG. 1.

The transmitted signal 402 is impaired by the linear distortion H of the upstream channel 403, by non-linear distortions, and by additive noise sources, including ingress noise and adjacent channel interference. The effects of ingress noise and adjacent channel interference are conceptually illustrated in FIG. 4 as summing blocks 412 and 413, respectively.

The receiver 411 includes an analog front end 420, a demodulator 421, and a modified matched filter (MMF) 414, which performs a convolution of a square-root raised cosine filter 415 and a pre-calculated filter 416 working at N times the symbol rate (e.g., N=2). The MMF filter 414 can be loaded from a table according to the estimated C/I and SNR. It should be noted that the pre-calculated filter 416 can be jointly designed with the transmission filter 405 to improve the overall SNR and C/I at the receiver 411. The output of the MMF 414 is provided to an adaptive equalizer 417, followed by a decoder 418, which may include additional filtering, a Viterbi detector, and a FEC decoder.

The MMF 414 can be designed to have low side lobes in the time domain. This is a deviation from an ideal square-root raised-cosine pulse. This deviation might be compensated for by the pre-equalizer 410. The reduction in side lobes in the time domain can also prevent the propagation of an impulse noise to symbols that were not originally hit by the impulse.

Figure 8:
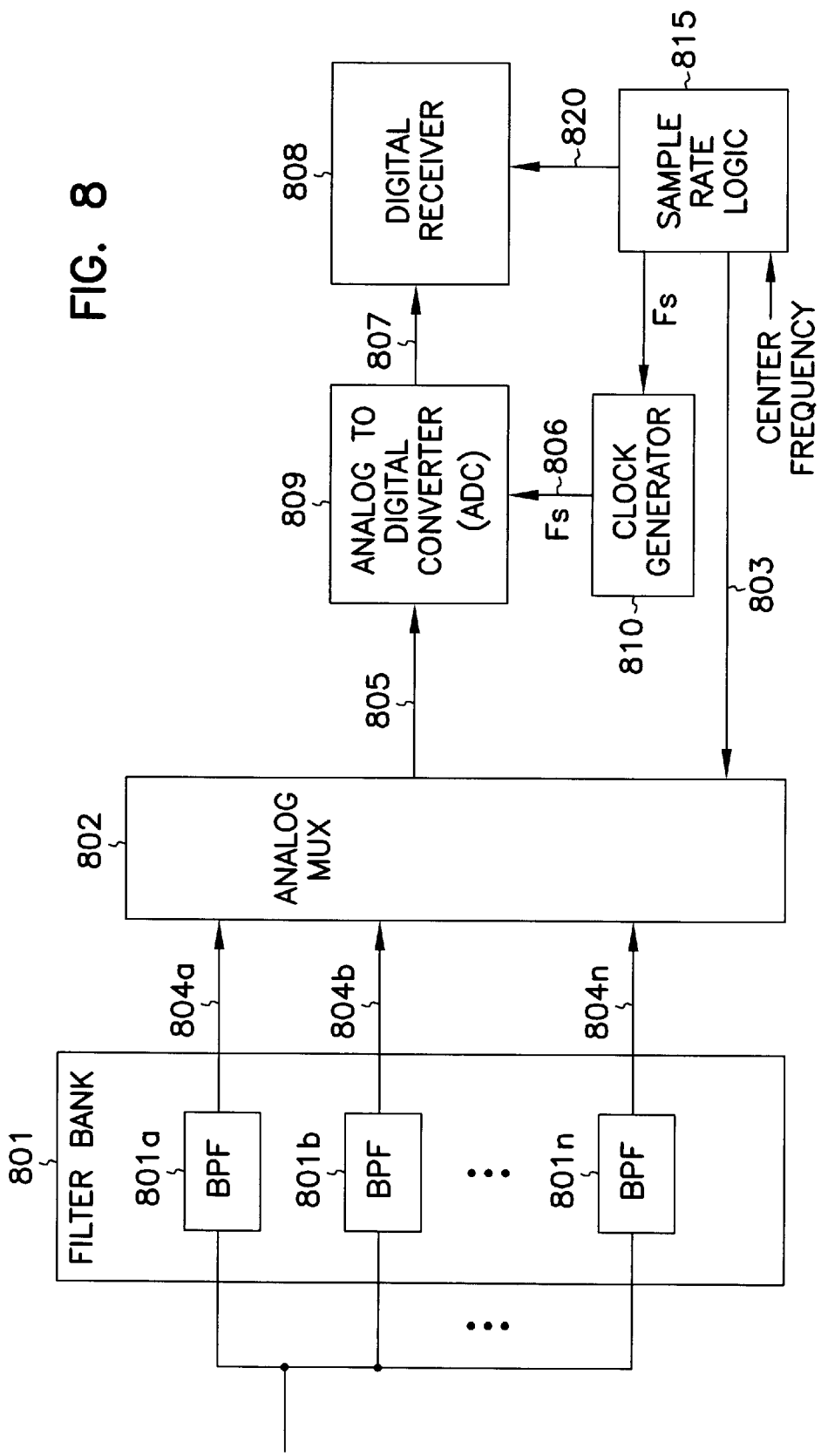
FIG. 8 depicts a structure of an analog front end that can be used in conjunction with the embodiment depicted in FIG. 4.

FIG. 8 depicts an example implementation of an analog front end 420. This implementation includes a filter bank 801 of band pass filters (BPFs) 801a, 801b, . . . , 801n. Each BPF 801 is centered around a different frequency. The output of the BPFs 801, denoted in FIG. 8 with reference numerals 804a, 804b, . . . , 804n, is input into an analog multiplexer 802. Sample rate logic 815 generates a select signal 803 as a function of the center frequency. The select signal 803 selects which of the BPF outputs 804 is coupled to an output 805 of the multiplexer 802.

A parameter $F_s$, also generated by the sample rate logic 815 as a function of the center frequency and denoted with reference numeral 806, defines the sample rate of an analog to digital converter (ADC) 809 and is provided by a clock generator 810. In this embodiment, the sample rate can be smaller than the Nyquist rate and can be chosen such that deliberate aliasing will shift the center frequency of the desired signal from its original frequency $F_{ca}$, which can be greater than $F_s/2$, to a new frequency $F_{cb}$, such that $F_{cb}$ is less than $F_s/2$. Thus, deliberate aliasing facilitates the use of discrete ADC components to sample signals having a frequency greater than half the frequency of the ADC. It will be appreciated by those skilled in the art that, when aliasing occurs due to undersampling, the digital receiver 808 should compensate for it. Accordingly, the sample rate logic 815 also provides a spectrum inversion indication 820 to the digital receiver 808 to indicate that undersampling has occurred.

Figure 5:
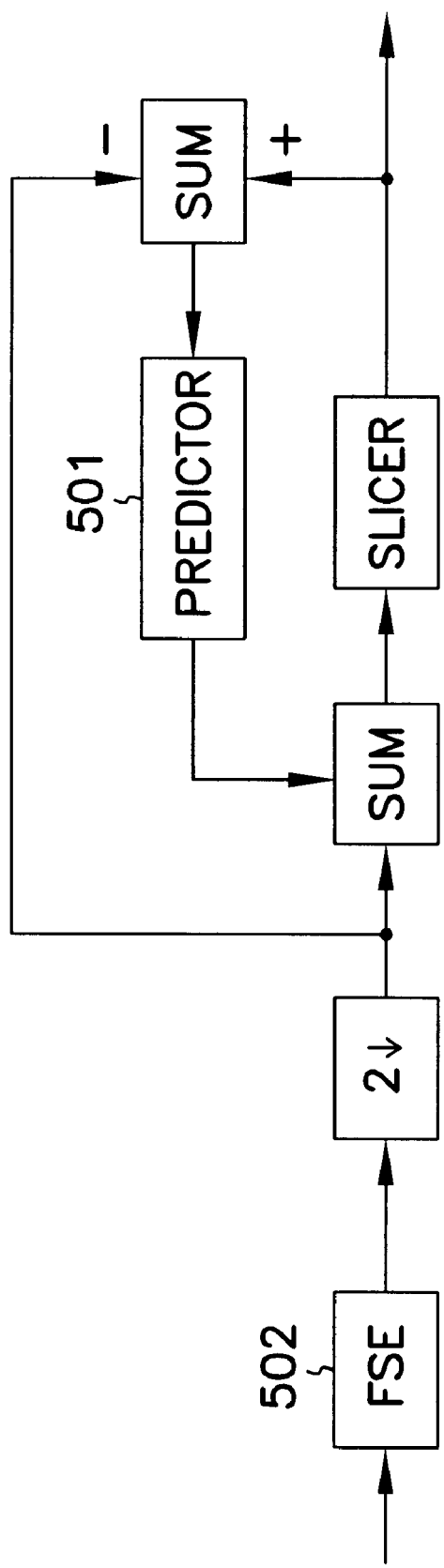
FIG. 5 depicts an example of an adaptive equalizer that can be used in conjunction with the embodiment depicted in FIG. 4.

An example of an adaptive equalizer is depicted in FIG. 5. The adaptive equalizer of FIG. 5 is an adaptive Decision Feedback Equalizer (DFE) operating in a noise prediction configuration 501, and it may be preceded by an adaptive FSE 502. By using the adaptive FSE 502, the magnitude of the DFE taps can be reduced using tap leakage procedures, thus reducing DFE error propagation. To avoid any error propagation at all, the adaptive FSE only can be used, completely avoiding the DFE. The equalizer taps are modified by a Linear Mean Square (LMS) approach. It can be trained during the ranging phase of the CMTS and/or pre-loaded using prior knowledge of channel spacing, and perhaps C/I and SNR.

Figure 6:
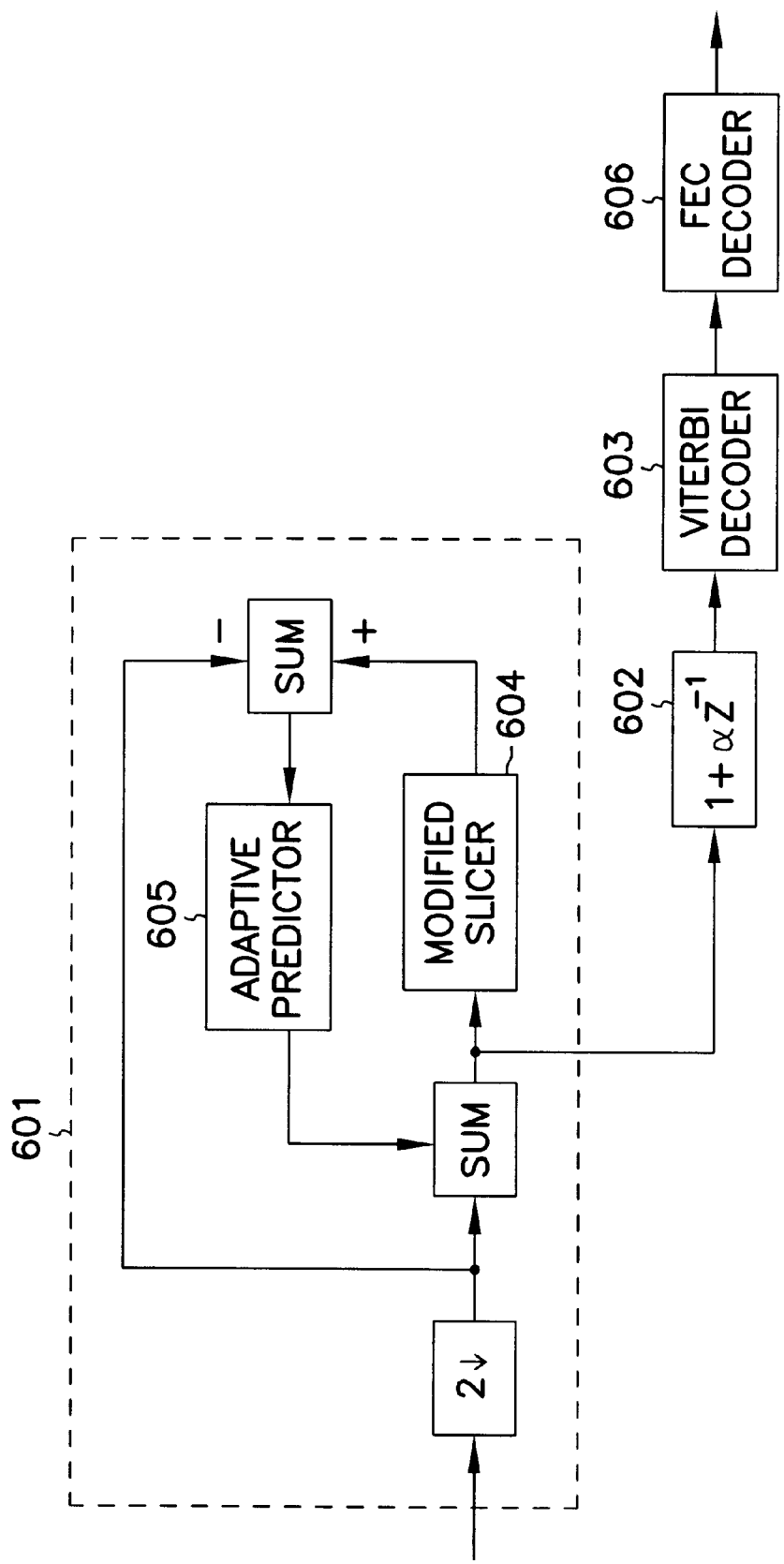
FIG. 6 depicts an example decoder structure that can be used in conjunction with the embodiment depicted in FIG. 4.

FIG. 6 depicts the structure of the decoder when a duo-path pulse $1+\alpha z^{-N}$, where $\alpha$ can be a complex number, is used. An equalizer 601 is adjusted to achieve a sum of two symbols at its output. The output of the equalizer passes through a $1+\alpha z^{-N}$ filter 602, and then goes to a Viterbi detector 603. For example, if the encoder output 419 in FIG. 4 is QPSK symbols ±I±, then the modified slicer 604 of the DFE searches for constellation points I+jQ, where I and Q can have values of 2, 0, and −2. The adaptive DFE 605 is trained to minimize the error between the slicer input and the slicer output.

The complexity of the Viterbi is 4 states and 16 branches per QPSK symbol and 16 states and 256 branches in 16QAM. As an alternative, a reduced 16QAM version of 4 states and 16 branches per symbol can be used.

It should be noted that, instead of a DFE, advance equalization techniques such as a maximum likelihood sequence estimator (MLSE) can be used. The idea here is to implement noise prediction and compensation of deliberate ISI due to transmission pulse using a reduced Viterbi equalizer.

Figure 7:
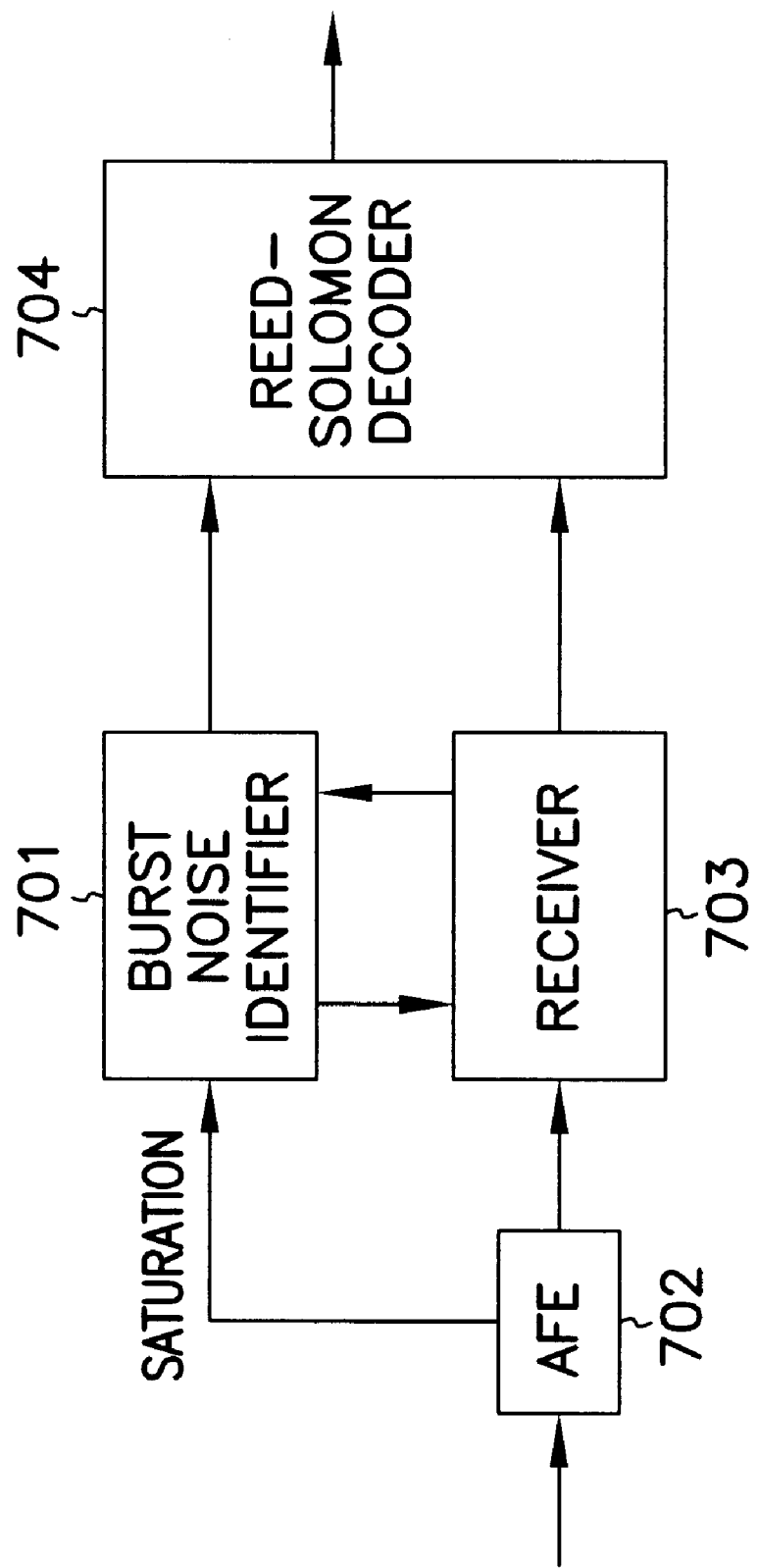
FIG. 7 depicts an example structure of a modified Reed-Solomon decoder that can be used in conjunction with the embodiment depicted in FIG. 4.

The FEC decoder 606 can be implemented using a conventional Reed-Solomon decoder, assuming this is the code being used in the system. Alternatively, one can use the configuration depicted in FIG. 7, where the burst noise identifier 701 identifies an exceptional data point based on inputs from an Analog Front End (AFE) 702 and a QPSK/16QAM receiver 703 and analyzes the presence and the length of noise burst. The Reed-Solomon decoder 704 uses erasures for the data bytes that are suspected to be affected by noise.

The exceptional data points are detected by either saturations or very large values of the data at the signal path (e.g., at the slicer input), a sequence of large error values at the slicer, or yielding of different symbol decisions for the two signals in retransmission mode. The receiver has a state machine that estimates burst duration according to the indication of exceptional data points and puts the Reed-Solomon decoder in an erasure mode during the burst. In addition, the receiver performs clipping of signals with exceptionally large magnitudes.

The present invention can be used in conjunction with reduced spaced signal constellations, such as that depicted in FIG. 3, by following the procedures described. in U.S. Pat. No. 5,710,797. In particular, the algorithm may iterate as follows. For a set of overlapping signals, the previously processed signal is subtracted from the received signal. A signal is then detected using the receiver 410 and is remodulated. The algorithm should start with the signal having the best C/I and SNR, which is typically the strongest signal, or a signal that has only one overlapping ACI, rather than two.

Pairs of severely interfering signals may be jointly detected using an encoded joint maximum likelihood approach, as part of the iterations of a method, the general procedure of which is outlined in U.S. Pat. No. 5,710,797. The joint maximum likelihood procedure involves a Viterbi-like algorithm for which a trellis diagram with a branch metric is defined. The complexity of such an approach, based on a memory constraint of three symbols for each signal, is 16 states and 256 branches per symbol with QSPK and 256 states and 64K branches per symbol in 16QAM. The number of transitions can be significantly reduced using a reduced state Viterbi algorithm, e.g., by discarding states in the trellis diagram that are unlikely for the current signal sample. The algorithm then selects a survivor path for each of the remaining new states based on the cumulative metric for all possible paths entering the new state from the previous states, followed by the selection of the leading path, and detection of the information bits. The algorithm then discards unlikely new states based on the cumulative metrics.

The present invention can also be used in conjunction with a frequency hopping scheme, using joint frequency/ time axis forward error correction and interleaving.

As part of the signal acquisition stage, in which the received signal parameters are estimated, the receiver 411 makes use of a preamble field in a data packet. In the presence of impulse and burst noise, the preamble should be longer than the duration of the longest error burst that can be recovered by the receiver (i.e., at least 2 t bytes if Reed-Solomon block code (N−t,N) is used, where N is the block size. The preamble is split into sections, and the receiver identifies sections that are noisy, for example, according to the residual error between the incoming signal and the expected signal according to the known training data and estimated parameters. Sections that are noisy due to impulse or burst noise are neglected.

In case the receiver is capable of recovering a very long error burst, in particular, if interleaving is used, then the packet structure PDDDPDDDD . . . D may be used, where P is a preamble section and D is a data section. The distance between P sections will be larger then the maximum burst length that can be received.

Acquisition performance can be severely affected by narrow-band interference, such as ingress noise, e.g., narrow-band interference, or partially overlapping channels. Thus, it is particularly advantageous to use a preamble that has low spectral density at frequency regions of high noise and high spectral density at frequency regions of low noise. This can be achieved using a pre-equalizer in the transmitter, or by using a non-white sequence of symbols. As a result, the interference of the transmitted preamble into overlapping adjacent channels will be reduced, enabling robust acquisition of overlapping signals.

Figure 9:
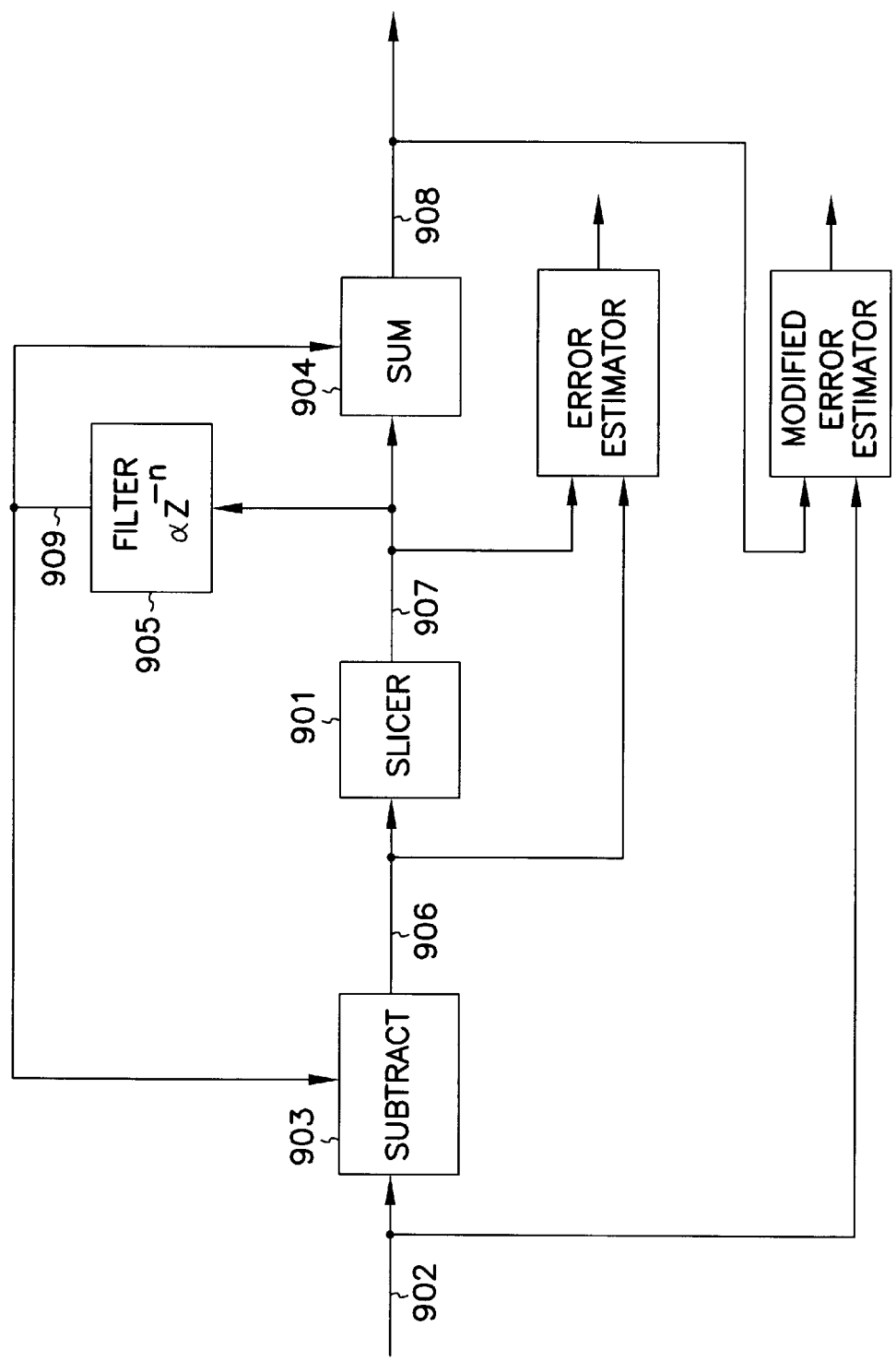
FIG. 9 depicts a structure of a modified slicer that can be used in conjunction with the embodiment depicted in FIG. 4.

FIG. 9 depicts a modified slicer structure that can be used in connection with the communication apparatus of FIG. 4. In this modified slicer structure, a slicer 901 produces an estimate 907 of the original transmitted symbol 419 of FIG. 4. This estimate is filtered by a digital filter 905 whose response is $\alpha Z{-}n$, that is, delayed by n taps and multiplied by $\alpha$, where $\alpha$ can be a complex number. An output 909 of the filter 905 is subtracted from the next input sample 902 by a subtractor 903 to generate a slicer input 906. The output 909 is also summed with a slicer output 907 by a summer 904 to generate a modified slicer output 908. In receivers where an error estimate is needed for adaptation, such an estimate can be calculated by subtracting the slicer output 907 from the slicer input 906 using error estimator 911 or by subtracting the modified slicer output 908 from the estimate 902 using modified error estimator 913. The latter calculation method realizes improved robustness for error propagation.

According to another embodiment of the present invention, channel throughput and communications robustness are increased using re-transmission techniques and/or diversity techniques. These techniques are particularly useful when the receiver is incapable of detecting the transmitted data from a single transmission. There are different MCNS channels, e.g., different time slots or different carrier frequencies.

Figure 10:
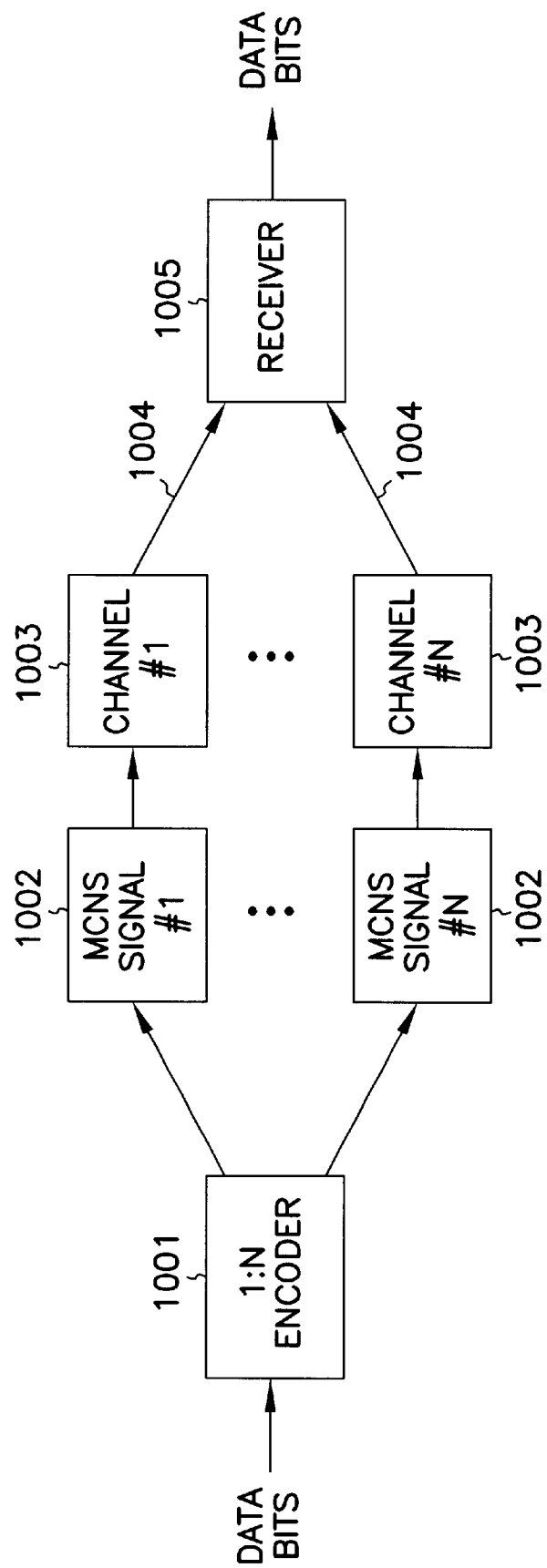
FIG. 10 depicts a general scheme employing diversity or retransmission techniques, or both, over different MCNS channels.

FIG. 10 depicts a general scheme that utilizes diversity and/or retransmission techniques over different MCNS channels according to this embodiment of the present invention. A 1:N rate encoder 1001 reproduces the current symbol or the current FEC block N times. Each reproduced symbol or block is transmitted using N MCNS signals 1002 to be communicated to the CMTS 103 of FIG. 1 over N different channels 1003. It will be appreciated that the N channels represent physical (e.g., different carriers) and/or logical channels and can overlap in frequency. Outputs 1004 of the N channels are provided to a receiver 1005, which performs weighted soft-combining of the received signals 1004. The soft-combining comprises Mean Squared Error (MSE) estimation as well as identification of burst noise within the packet, followed by weighted or selective combining, as appropriate. The receiver 1005 can also incorporate joint equalization of the received signals.

The system in FIG. 10 can also be interpreted as a retransmission technique in which the first MCNS signal transmitted over the first channel is the original message and all subsequent messages are requested by the CMTS 103 of FIG. 1 one, or several, at a time to be retransmitted. According to a specific embodiment, a soft-combining method is applied to all the received messages.

For example, a retransmission request, possibly at a different carrier, can be sent from the CMTS 103 to the CM 101 of FIG. 1 via the downstream channel 105 only if a Reed-Solomon block is received incorrectly. If a Reed-Solomon block is received incorrectly, then instead of requesting retransmission, the CMTS 103 tells the CM 101 what it received, so that the CM 101 can send to the CMTS 103 a short correction message rather than sending the whole packet again. For example, the CMTS 103 may send back to the CM 101 an indication of the quality level of the detected symbols or the detected symbols themselves. Since the downstream channel 105 is much wider and more reliable than the upstream channel 106, this approach may be preferable.

Figure 11:
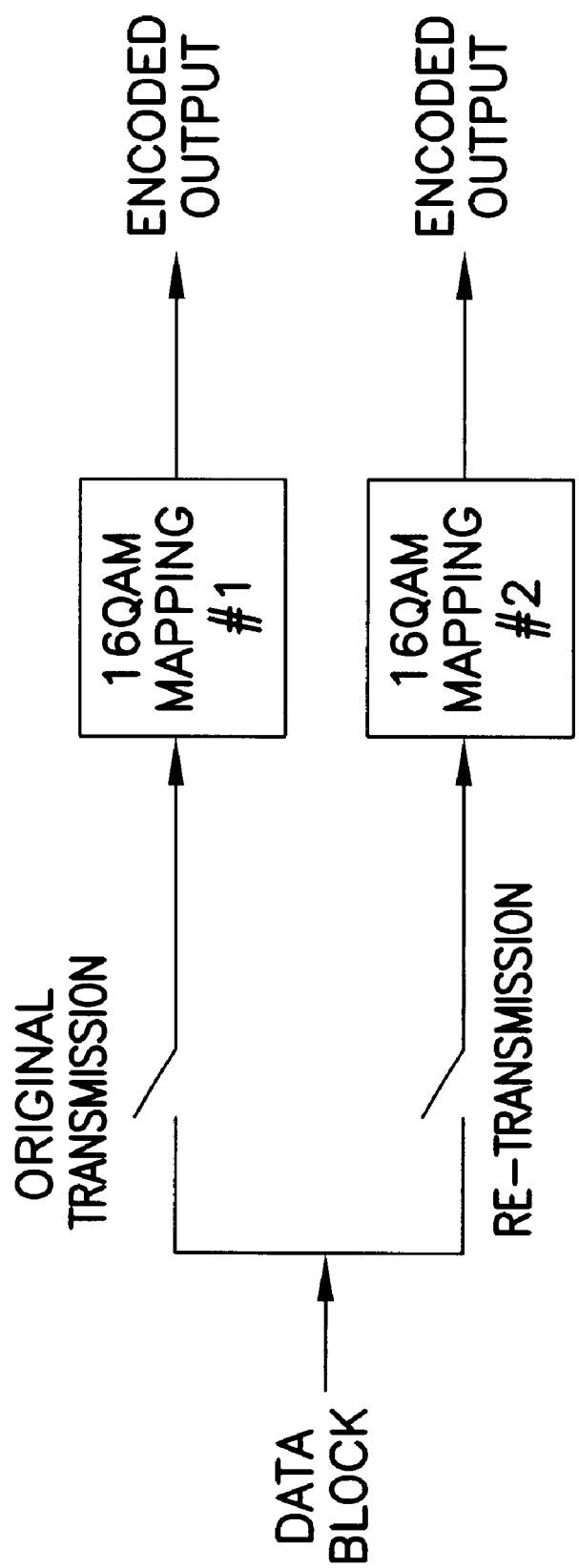
FIG. 11 depicts a signal retransmission technique that can be used in conjunction with the embodiment depicted in FIG. 10.

FIG. 11 depicts a particular retransmission scheme in which a different mapping for 16QAM is used for the retransmission. Two symbol mapping schemes are illustrated in FIGS. 12A–12B, in which A1, A2, A3, A4, B1, B2, B3, B4, C1, C2, C3, C4, D1, D2, D3, and D4 represent the sixteen combinations of four bits.

Figure 13:
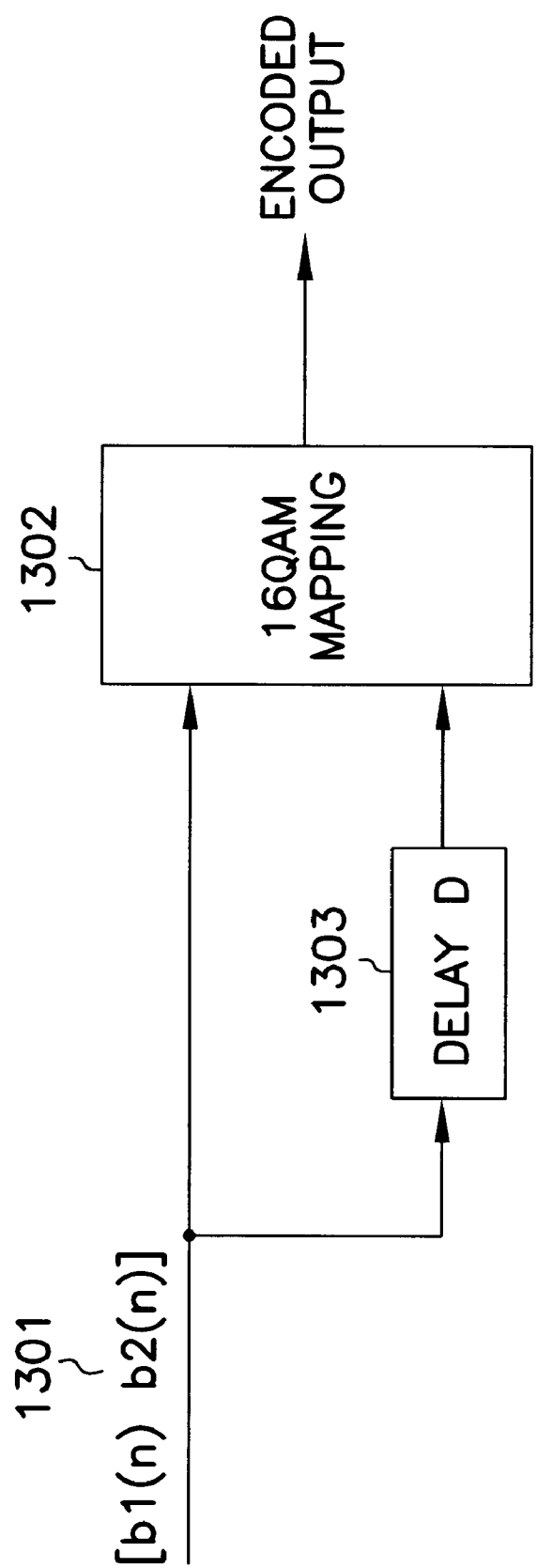
FIG. 13 depicts an example signal diversity technique that can be used in conjunction with the embodiment depicted in FIG. 10.

FIG. 13 depicts a signal diversity system. In this system, two information bits [b1(n) b2(n)], denoted by reference numeral 1301, per symbol are transmitted. The symbols are 16QAM and are mapped using a signal mapping block 1302 as a function of [b1(n) b2(n) b1(n–D) b2(n–D)], where D is a delay introduced by a delay block 1303. FIG. 14 depicts an example mapping scheme.

Using this approach, bursts of length D symbols can be recovered. In this approach, the carrier frequency may change between two transmissions of the same data. This change in carrier frequency can be used to protect from narrow band interference.

Conclusion

Although specific embodiments have been illustrated and described herein, it will be appreciated by those of ordinary skill in the art that any arrangement which is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

What is claimed is:

1. A communication system for communicating a data signal using a cable television transmission medium, the communication arrangement comprising:
    an encoder configured to encode an input data stream as an encoder output signal;
    a transmission filter arrangement, responsive to the encoder output signal and configured to reduce adjacent channel interference in the encoder output signal and to generate a filter output signal;
    a modulator, configured to modulate the filter output signal, generating a modulated radio frequency signal for transmission using the cable television transmission medium; and
    a receiver arrangement coupled to receive the modulated radio frequency signal and configured to generate a stream of detected data based on the received modulated radio frequency signal, wherein the receiver arrangement comprises:
        an analog front end arrangement, configured to sample a desired signal from the received modulated radio frequency signal at less than the Nyquist rate and to cause thereby a shift in a center frequency of the desired signal from an initial frequency to a lower frequency;
        a modified matched filter configured to perform a convolution of a square-root raised cosine filter and a pre-calculated filter and to generate a modified matched filter output signal;
        an adaptive equalizer, responsive to the modified matched filter output signal and configured to generate an equalizer output signal; and
        a decoder, responsive to the equalizer output signal and configured to decode the equalizer output signal and to generate the stream of detected data.

2. A communication system, according to claim 1, wherein the analog front end arrangement comprises:
    a plurality of band pass filters coupled to receive the modulated signal, each of the band pass filters centered around a different frequency;
    a multiplexer coupled to receive output signals from the band pass filters and to couple a selected one of the band pass filter output signals to an output of the multiplexer;
    an analog to digital converter, responsive to the output of the multiplexer and to an output of a clock signal generator and configured to provide a digital signal, generated as a function of the output of the multiplexer and the output of the clock signal generator, to a digital receiver.

3. A communication arrangement, according to claim 2, wherein the analog front end arrangement further comprises sample rate logic configured to provide, as a function of the center frequency, a select signal to the multiplexer, a rate parameter to the clock signal generator, and a spectrum inversion indication to the digital receiver.

4. A communication system, according to claim 1, wherein the adaptive equalizer comprises an adaptive decision feedback equalizer.

5. A communication system, according to claim 1, wherein the pre-calculated filter comprises
    a pre-equalizer, configured to reduce interference attributable to at least one of ISI and ingress noise associated with a communication channel, and
    a $1+\alpha z^{-N}$ filter, coupled to the output of the pre-equalizer and configured to generate a filter output signal;
    and wherein the receiver arrangement comprises
        a Viterbi decoder, configured to generate a Viterbi decoder output signal as a function of the filter output signal; and
        a forward error correction decoder, configured to generate a corrected decoder output signal in response to the Viterbi decoder output signal.

6. A communication system, according to claim 1, further comprising a modified slicer arrangement configured to produce an estimate of an original transmitted symbol.

7. A communication system, according to claim 6, wherein the modified slicer arrangement comprises:
    a slicer configured to estimate an output of the encoder;
    a filter having a response of $\alpha Z^{-N}$;
    a summing arrangement configured to add an output of the slicer to an output of the filter having a response of $\alpha Z^{-N}$;
    a subtracting arrangement configured to subtract the output of the filter having a response of $\alpha Z^{-N}$ from an input of the modified slicer;
    an error estimation arrangement, coupled to both an input and the output of the slicer and configured to estimate a receiver error; and
    a modified error estimation arrangement, coupled to both an input and the output of the modified slicer and configured to estimate the receiver error.

8. A communication system for communicating a data signal using a cable television transmission medium, the communication arrangement comprising:

an encoder configured to encode an input data stream as an encoder output signal;

a transmission filter arrangement, responsive to the encoder output signal and configured to reduce adjacent channel interference in the encoder output signal and to generate a filter output signal;

a modulator, configured to modulate the filter output signal, generating a modulated radio frequency signal for transmission using the cable television transmission medium;

an analog front end arrangement, configured to sample a desired signal from the modulated radio frequency signal at less than the Nyquist rate and thereby to cause a shift in a center frequency of the desired signal from an initial frequency to a lower frequency;

a modified matched filter configured to perform a convolution of a square-root raised cosine filter and a pre-calculated filter and to generate an modified matched filter output signal;

an adaptive equalizer, responsive to the modified matched filter output signal and configured to generate an equalizer output signal; and a decoder, responsive to the equalizer output signal and configured to decode the equalizer output signal and to generate a stream of detected data.

9. A communication method for communicating a data signal using a cable television transmission medium, the communication method comprising:

encoding an input data stream as an encoder output signal;

filtering the encoder output signal to reduce adjacent channel interference in the encoder output signal, thereby generating a filter output signal;

modulating the filter output signal to generate a modulated radio frequency signal for transmission using the cable television transmission medium;

receiving the modulated radio frequency signal;

generating a stream of detected data based on the received modulated radio frequency signal;

sampling a desired signal from the received modulated radio frequency signal at less than the Nyquist rate and causing thereby a shift in a center frequency of the desired signal from an initial frequency to a lower frequency;

performing a convolution of a square-root raised cosine filter and a pre-calculated filter and to generate an modified matched filter output signal;

generating an equalizer output signal as a function of the modified matched filter output signal; and decoding the equalizer Output signal to generate the stream of detected data.

10. A communication method, according to claim 9, further comprising:

providing a select signal to the multiplexer as a function of the center frequency;

providing a rate parameter as a function of the center frequency; and providing a spectrum inversion indication as a function of the center frequency.

* * * * *